United States Patent
Cashler et al.

(10) Patent No.: US 9,836,977 B1
(45) Date of Patent: Dec. 5, 2017

(54) AUTOMATED VEHICLE STEERING CONTROL SYSTEM WITH LANE POSITION BIAS

(71) Applicant: DELPHI TECHNOLOGIES, INC., Troy, MI (US)

(72) Inventors: Robert J. Cashler, Kokomo, IN (US); Premchand Krishna Prasad, Carmel, IN (US); Ehsan Samiei, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 15/175,494

(22) Filed: Jun. 7, 2016

(51) Int. Cl.
*B60W 30/09* (2012.01)
*G08G 1/16* (2006.01)
*G05D 1/00* (2006.01)
*G05D 1/12* (2006.01)
*G05D 1/02* (2006.01)
*H04L 29/08* (2006.01)

(52) U.S. Cl.
CPC ........... *G08G 1/167* (2013.01); *G05D 1/0088* (2013.01); *G05D 1/028* (2013.01); *G05D 1/12* (2013.01); *H04L 67/12* (2013.01)

(58) Field of Classification Search
CPC combination set(s) only.
See application file for complete search history.

(56) References Cited

U.S. PATENT DOCUMENTS

| | | | |
|---|---|---|---|
| 5,959,572 A * | 9/1999 | Higashimata | B60K 31/0008 340/903 |
| 6,311,119 B2 | 10/2001 | Sawamoto et al. | |
| 8,260,491 B2 | 9/2012 | Brighenti et al. | |
| 2002/0198632 A1* | 12/2002 | Breed | B60N 2/2863 701/1 |
| 2010/0082195 A1* | 4/2010 | Lee | B62D 15/025 701/25 |
| 2013/0238181 A1 | 9/2013 | James | |

* cited by examiner

*Primary Examiner* — Edward J Pipala
(74) *Attorney, Agent, or Firm* — Larry Hazelton

(57) ABSTRACT

A steering-control system for an automated vehicle includes an object-detector and a controller. The object-detector is suitable for use on a host-vehicle. The object-detector is used to detect an other-vehicle approaching the host-vehicle, and to detect a stationary-object that defines a roadway traveled by the host-vehicle. The controller is in communication with the object-detector and adapted to operate the host-vehicle. The controller is configured to steer the host-vehicle towards a centered-position of a travel-lane of the roadway when a projected-path of the other-vehicle approaches the host-vehicle to a minimum-distance between the other-vehicle and the host-vehicle greater than a distance-threshold. The controller is also configured to steer the host-vehicle towards a biased-position of the travel-lane to increase the minimum-distance when the projected-path approaches the host-vehicle to less than the distance-threshold if the host-vehicle remains in the centered-position.

4 Claims, 2 Drawing Sheets

AUTOMATED VEHICLE STEERING CONTROL SYSTEM WITH LANE POSITION BIAS

TECHNICAL FIELD OF INVENTION

This disclosure generally relates to a steering-control system for an automated vehicle, and more particularly relates to a system that steers a host-vehicle towards an off-center or biased-position of a travel-lane when a projected-path of an other-vehicle approaches the host-vehicle to less than the distance-threshold if the host-vehicle were to remain in a centered-position.

BACKGROUND OF INVENTION

It has been observed that a human-operator often exhibits driving behavior patterns that are less predictable, i.e. more erratic, when compared to automated operation of a vehicle. For example, a human operated vehicle may have a less stable lane-position, i.e. may weave more than a typical automated vehicle. As long as humans are able to directly operate a vehicle, instances of vehicles exhibiting erratic or unpredictable driving behaviors are likely to occur.

SUMMARY OF THE INVENTION

In accordance with one embodiment, a steering-control system for an automated vehicle is provided. The system includes an object-detector and a controller. The object-detector is suitable for use on a host-vehicle. The object-detector is used to detect an other-vehicle approaching the host-vehicle, and to detect a stationary-object that defines a roadway traveled by the host-vehicle. The controller is in communication with the object-detector and adapted to operate the host-vehicle. The controller is configured to steer the host-vehicle towards a centered-position of a travel-lane of the roadway when a projected-path of the other-vehicle approaches the host-vehicle to a minimum-distance between the other-vehicle and the host-vehicle greater than a distance-threshold. The controller is also configured to steer the host-vehicle towards a biased-position of the travel-lane to increase the minimum-distance when the projected-path approaches the host-vehicle to less than the distance-threshold if the host-vehicle remains in the centered-position.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
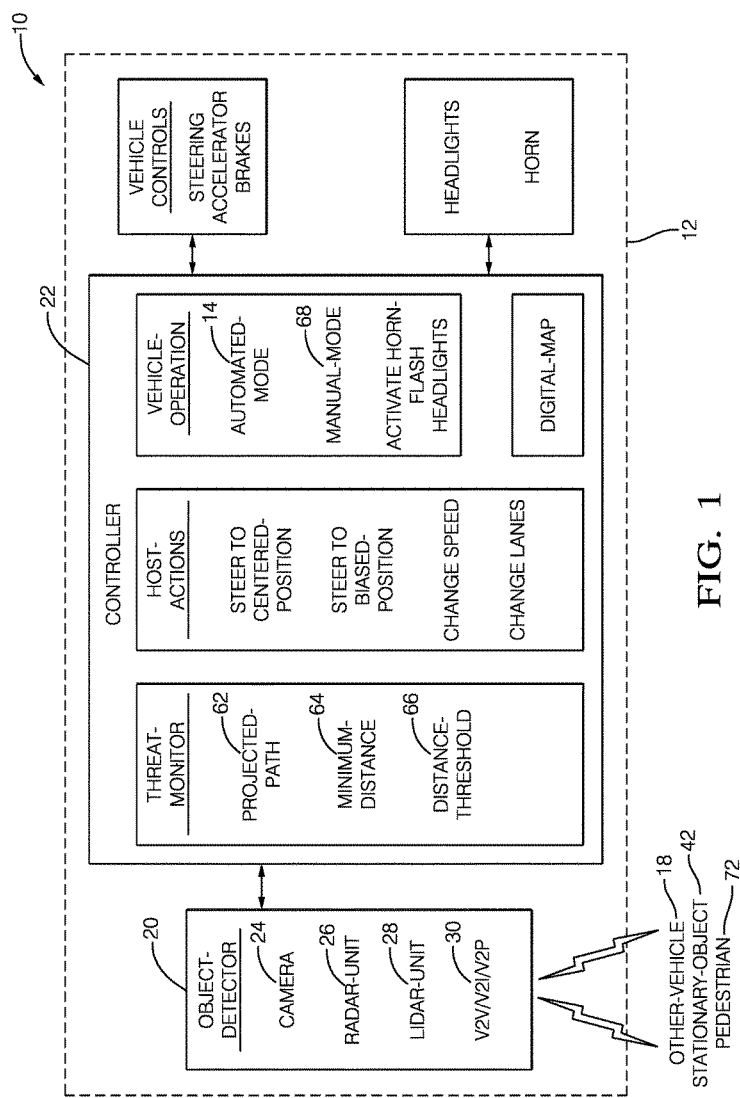
FIG. 1 is a diagram of a steering-control system in accordance with one embodiment.

FIG. 1 illustrates a non-limiting example of a steering-control system 10, hereafter referred to as the system 10, which is generally intended for operating an automated vehicle such as a host-vehicle 12. The non-limiting examples presented herein are generally directed to instances when the host-vehicle 12 is being operated in an automated-mode 14, i.e. a fully autonomous mode, where a human operator (not shown) of the host-vehicle 12 may do nothing more than designate a destination to operate the host-vehicle 12. However, it is contemplated that the teachings presented herein are useful when the host-vehicle 12 is operated in a manual-mode 16 where the host-vehicle 12 is operated for the most part by the human operator, and the degree or level of automation may be little more than providing route guidance to the human operator who is generally in control of the steering, accelerator, and brakes of the host-vehicle 12. That is, in the manual-mode 16 the system 10 may assist and/or only intervene with the operation of the host-vehicle 12 by the human operator if necessary to avoid a collision with, for example, an other-vehicle 18.

The system 10 includes an object-detector 20 which is deemed suitable for use on the host-vehicle 12 as the object-detector 20 is generally designed to operate over the range of ambient temperatures experienced by the host-vehicle 12, as will be recognized by those in the art. The object-detector 20 is, in one respect, used by a controller 22 of the system 10 to detect the other-vehicle 18 when the other-vehicle 18 is approaching the host-vehicle 12. However, the object-detector 20 is not limited to only this use as will become evident below. The other-vehicle 18 may approach the host-vehicle 12 from behind (FIG. 2) in preparation to pass the host-vehicle 12, or approach from ahead as oncoming traffic in an opposing-lane of a roadway, or approach from beside when the other-vehicle 18 changes lanes to an adjacent-lane next to a travel-lane 38 to that presently occupied by the host-vehicle 12.

The controller 22 is in communication with the object-detector 20 and is adapted to operate the host-vehicle via the vehicle-controls on a full-time basis (i.e. autonomous operation) or on a temporary basis as needed to assist the human operator. The communication between the object-detector 20 and the controller 22 may be by way of wires, wireless communication, or optical-fiber, as will be recognized by those in the art. The controller 22 may include a processor (not specifically shown) such as a microprocessor or other control circuitry such as analog and/or digital control circuitry including an application specific integrated circuit (ASIC) for processing data as should be evident to those in the art. The controller 22 may include memory (not specifically shown), including non-volatile memory, such as electrically erasable programmable read-only memory (EEPROM) for storing one or more routines, thresholds, and captured data. The one or more routines may be executed by the processor to perform steps for determining, for example, the relative-location 36 based on signals received by the controller 22 for operating the host-vehicle 12 as described herein.

The function of the object-detector 20 may be provided by, but is not limited to, a camera 24, a radar-unit 26, a lidar 28, or any combination thereof. The function of the object-detector 20 may also be provided or supplemented by a transceiver (not shown) configured for wireless communications 30 such as vehicle-to-infrastructure (V2I) communications, vehicle-to-vehicle (V2V) communications, and/or vehicle-to-pedestrian (V2P) communications, which may be generically referred to as V2X communications, as will be recognized by those in the art.

Figure 2:
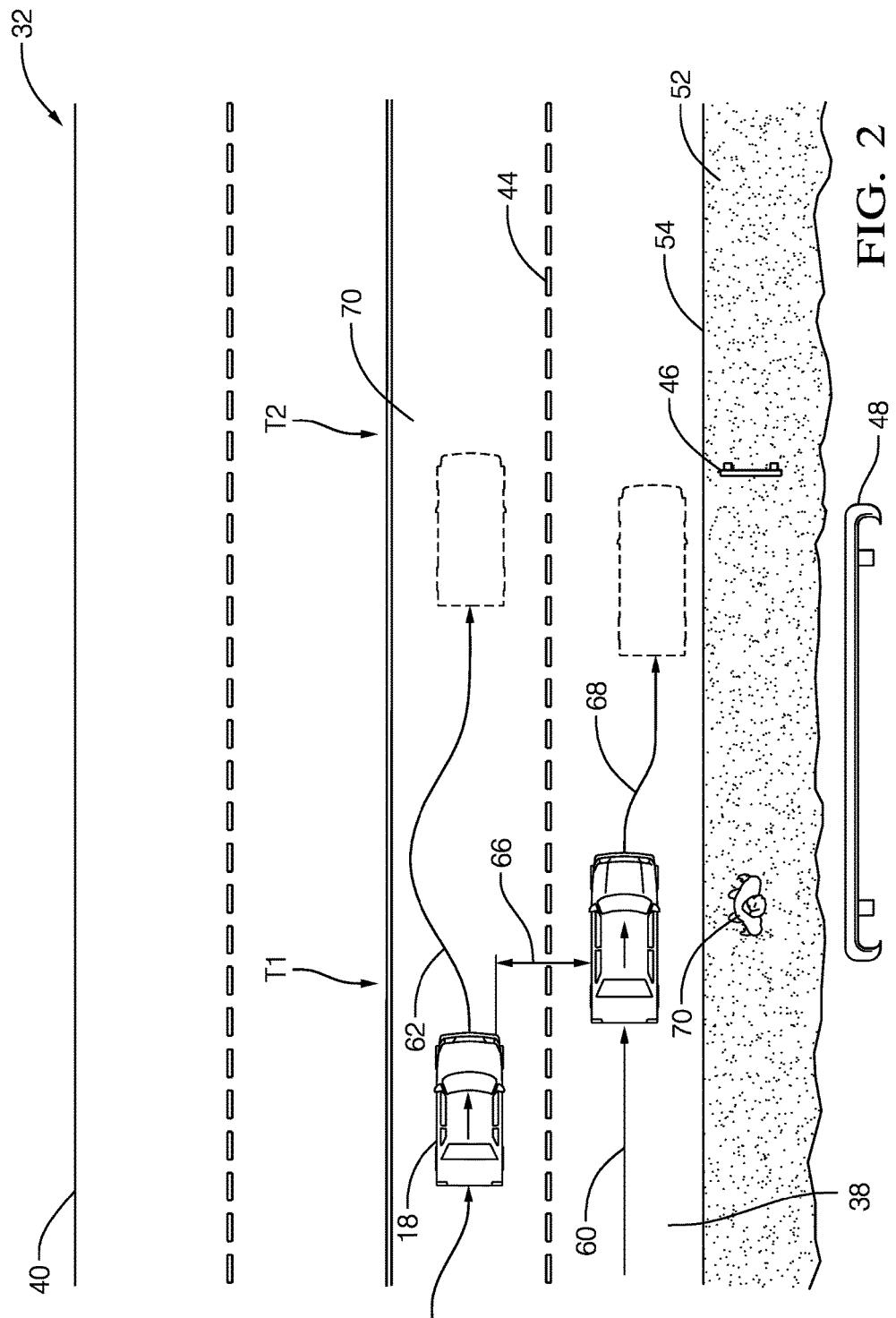
FIG. 2 is a traffic-scenario encountered by the system of FIG. 1 in accordance with one embodiment.

FIG. 2 illustrates a non-limiting example of a traffic-scenario 32 that the host-vehicle 12 may encounter. At time T1 the host-vehicle 12 is traveling along the travel-lane 38 of a roadway 40, and is about to be passed by the other-vehicle 18 approaching from behind the host-vehicle 12. As will be explained in more detail below, the system 10, or more specifically the controller 22, may determine that the other-vehicle 18 is now (at time T1), or is likely in the future (e.g. at time T2) to be, too close to the host-vehicle 12 and thereby risks a collision with the host-vehicle 12. As a first reaction to this problem, the controller 22 is generally configured to steer the host-vehicle 12 away from the other-vehicle 18. How to steer away is preferably limited to keep the host-vehicle 12 in the travel-lane 38, but exiting the travel-lane 38 is a secondary or back-up action if staying in the travel-lane 38 is ill-advised.

In order for the controller 22 to be able to determine where the host-vehicle 12 is or should be positioned on the roadway 40 or the travel-lane 38, the controller 22 also uses the object-detector 20 to detect a stationary-object 42 (FIG. 1) that defines the boundaries or extents of the roadway 40 traveled by the host-vehicle 12. The stationary-object 42 may be one or more of, but is not limited to, a lane-marking 44, a road-sign 46, a guardrail 48, a shoulder 52, and a road-edge 54.

If the other-vehicle 18 is traveling relatively straight and centered in the adjacent-lane 70, which is contrary to what is shown in FIG. 2, the controller 22 is generally configured to steer the host-vehicle 12 towards a centered-position 60 of the travel-lane 38 of the roadway 40 when a projected-path 62 of the other-vehicle 18 approaches the host-vehicle 12 to a minimum-distance 64 (measured between the other-vehicle 18 and the host-vehicle 12) that is greater than a distance-threshold 66, one meter (1 m) for example. That is, the host-vehicle 12 generally remains in the center of the travel-lane 38 as long as the other-vehicle 18 is actually not too close, and is projected to not become too close. Contrariwise, if the other-vehicle 18 is weaving and/or is not centered in the adjacent-lane 70, as shown in FIG. 2, the controller 22 is generally configured to avoid the host-vehicle 12 being too close to the other-vehicle 18. To this end, the controller 22 is further configured to steer the host-vehicle 12 towards a biased-position 68 of the travel-lane 38 to increase the minimum-distance 64 when the projected-path 62 approaches the host-vehicle 12 to less than the distance-threshold 66 if the host-vehicle 12 remains in the centered-position 60.

While FIG. 2 may be interpreted to suggest that the host-vehicle 12 will only move as far as the road-edge 54 to increase the distance or clearance between the host-vehicle 12 and the other-vehicle 18, it is contemplated that the host-vehicle 12 may operate partially (e.g. two-wheels) on the shoulder 52 if the speed of the host-vehicle 12 and the perceived conditions of the shoulder 52 would make doing so relatively safe. While traveling in the biased-position 68, the object-detector 20 is used to take into account the presence of, for example, the lane-marking 44, the road-sign 46, the guardrail 48, the shoulder 52, the road-edge 54, and/or any other object proximate to the travel-lane 38 such as a pedestrian 72. The pedestrian 72 may be detected by, for example, the camera 24 or V2P communications.

In addition to changing lane-position from the centered-position 60 to the biased-position 68, the controller 22 may be further configured to change a speed 74 of the host-vehicle 12 when the projected-path 62 approaches or is predicted to approach the host-vehicle 12 to a minimum-distance 64 that is less than the distance-threshold 66 if the host-vehicle remains in the biased-position 68 and the speed 74 remains unchanged. For example, the host-vehicle 12 may time a slow-down to correspond to when the weaving pattern of the other-vehicle 18 places the other-vehicle 18 in a centered or left-of-center position in the adjacent-lane 70 and/or so the other-vehicle 18 passes by more quickly. By way of further example, the host-vehicle 12 may speed-up to get to an exit-ramp (not shown) before the other-vehicle 18 begins pass.

In addition to the options described above, the controller 22 may be further configured to steer the host-vehicle 12 to change the travel-lane 38 of the host-vehicle 12 when the projected-path 62 approaches the host-vehicle 12 to less than the distance-threshold 66 if the host-vehicle 12 remains in the biased-position 68. That is, the controller 22 may steer the host-vehicle to affect a lane-change if moving to biased-position 68 is insufficient. With reference to FIG. 2, this may result in the host-vehicle 12 steering completely onto the shoulder 52, i.e. all four wheels on the shoulder. By way of further example, if the host-vehicle 12 was traveling in the center-lane of a three-lane expressway, and the other-vehicle 18 was traveling in the left-lane, the host-vehicle 12 may change lanes to the right lane to avoid being too close to the other-vehicle 18.

In addition to steering the host-vehicle 12 to avoid close proximity by the other-vehicle 18, the controller may activate the horn of the host-vehicle 12, and/or flash the headlights and/or tail lights of the host-vehicle 12 in an attempt to get the attention the operator of the other-vehicle 18 and/or warn any other-vehicles (not shown) that the other-vehicle 18 is driving erratically.

Accordingly, a steering-control system (the system 10), a controller 22 for the system 10 and a method of operating the system 10 is provided. The preference is for the host-vehicle 12 to move to a position in the travel-lane 38 that is still within the travel-lane 38 as illustrated in FIG. 2 rather than make a lane change as the first action taken when the other-vehicle 18 gets too close, i.e. closer than the distance-threshold 66. However, if moving to the biased-position is insufficient, then as a secondary option the host-vehicle 12 may executive a lane change.

While this invention has been described in terms of the preferred embodiments thereof, it is not intended to be so limited, but rather only to the extent set forth in the claims that follow.

We claim:

1. A steering-control system for an automated vehicle, said system comprising:
    an object-detector suitable for use on a host-vehicle, said object-detector used to detect an other-vehicle approaching the host-vehicle, and to detect a stationary-object that defines a roadway traveled by the host-vehicle;
    a controller in communication with the object-detector and adapted to operate the host-vehicle, said controller configured to steer the host-vehicle towards a centered-position of a travel-lane of the roadway when a projected-path of the other-vehicle approaches the host-vehicle to a minimum-distance between the other-vehicle and the host-vehicle greater than a distance-threshold, and steer the host-vehicle towards a biased-position of the travel-lane to increase the minimum-distance to greater than the distance-threshold when the projected-path approaches the host-vehicle to less than the distance-threshold if the host-vehicle remains in the centered-position.

2. The system in accordance with claim 1, wherein the stationary-object is one of, a lane-marking, a road-sign, a guardrail, a shoulder, and a road-edge.

3. The system in accordance with claim 1, wherein the controller is further configured to change a speed of the host-vehicle when the projected-path approaches the host-vehicle to less than the distance-threshold if the host-vehicle remains in the biased-position.

4. The system in accordance with claim 1, wherein the controller is further configured to steer the host-vehicle to change the travel-lane of the host-vehicle when the projected-path approaches the host-vehicle to less than the distance-threshold if the host-vehicle remains in the biased-position.

\* \* \* \* \*